(12) United States Patent
Jehle

(10) Patent No.: US 8,795,787 B2
(45) Date of Patent: Aug. 5, 2014

(54) SURFACE MODIFICATION

(75) Inventor: Heinrich Jehle, Frickenhausen (DE)

(73) Assignee: Greiner Bio-One GmbH, Frickenhausen (DE)

( * ) Notice: Subject to any disclaimer, the term of this patent is extended or adjusted under 35 U.S.C. 154(b) by 944 days.

(21) Appl. No.: 12/734,079

(22) PCT Filed: Oct. 10, 2008

(86) PCT No.: PCT/EP2008/008598
§ 371 (c)(1),
(2), (4) Date: May 27, 2010

(87) PCT Pub. No.: WO2009/049838
PCT Pub. Date: Apr. 23, 2009

(65) Prior Publication Data
US 2010/0234240 A1    Sep. 16, 2010

(30) Foreign Application Priority Data
Oct. 10, 2007    (AT) .................................. 1619/2007

(51) Int. Cl.
| | | |
|---|---|---|
| *C08J 7/00* | (2006.01) | |
| *C08J 7/16* | (2006.01) | |
| *C08J 7/18* | (2006.01) | |
| *H05H 1/24* | (2006.01) | |
| *B05D 5/00* | (2006.01) | |
| *B05D 1/00* | (2006.01) | |
| *C40B 20/02* | (2006.01) | |
| *C40B 30/04* | (2006.01) | |
| *C40B 40/06* | (2006.01) | |
| *C40B 60/12* | (2006.01) | |
| *B08B 17/00* | (2006.01) | |
| *B01L 3/00* | (2006.01) | |

(52) U.S. Cl.
CPC .. B05D 5/00 (2013.01); B05D 1/62 (2013.01); *B01L 3/502707* (2013.01); *B01J 2219/00635* (2013.01); *B01J 2219/0061* (2013.01); *B01J 2219/00612* (2013.01); *B01J 2219/00722* (2013.01); *B01J 2219/00605* (2013.01); *B01J 2219/00637* (2013.01)
USPC ............ 427/488; 264/483; 424/78.09; 506/3; 506/9; 506/16; 506/39

(58) Field of Classification Search
CPC ................ B81C 2201/018; B01J 2219/00635; C08J 7/00; C08J 7/16; C08J 7/18; B08B 17/00; H05H 1/24; C40B 20/02; C40B 30/04; C40B 40/06; C40B 60/12
USPC ........ 427/488; 264/483; 424/78.09; 506/3, 9, 506/16, 39
See application file for complete search history.

(56) References Cited

U.S. PATENT DOCUMENTS

| | | | |
|---|---|---|---|
| 4,806,246 A | 2/1989 | Nomura | |
| 6,436,481 B1 | 8/2002 | Chabrecek et al. | |
| 6,630,243 B2 | 10/2003 | Valint, Jr. et al. | |
| 6,902,812 B2 | 6/2005 | Valint, Jr. et al. | |
| 7,201,935 B1 * | 4/2007 | Claude et al. .................. | 427/2.1 |
| 2003/0198968 A1 | 10/2003 | Matson | |
| 2004/0206399 A1 | 10/2004 | Heller et al. | |
| 2005/0250156 A1 | 11/2005 | Shebuski et al. | |
| 2006/0166183 A1 | 7/2006 | Short et al. | |

FOREIGN PATENT DOCUMENTS

| | | |
|---|---|---|
| DE | 37 12 490 | 10/1987 |
| DE | 697 20 253 | 1/2004 |
| DE | 600 13 820 | 2/2005 |
| DE | 603 04 163 | 12/2006 |
| EP | 1 435 262 | 7/2004 |
| WO | WO 98/17407 | 4/1998 |
| WO | WO 98/28026 | 7/1998 |
| WO | WO 00/71613 | 11/2000 |
| WO | WO 01/31339 | 5/2001 |
| WO | WO 2004/111648 | 12/2004 |
| WO | WO 2006/109055 | 10/2006 |

OTHER PUBLICATIONS

Zou et al., Surface and Coatings Technology, 2002, 149:117-128.*
Schofield et al. (J. Amer. Chem. Soc., 2006, 128:2280-2285).*
Ameringer et al. (Biomacromolecules, 2005, 6:1819-1823).*
Bretagnol et al. (Acta Biomaterialia, 2006, 2:165-172).*
Wu et al. (Colloids and Surfaces B: Biointerfaces, 2000, 18:235-248).*
H. K. Yasuda, "Scope of Polymer Formation by Plasma Polymerization," Academic Press, London 1985, Chapter 2, pp. 4-5, total of one (1) page. (Spec, p. 2).
C. Brink, E. Österberg, K. Holmberg and F. Tiberg, "Using poly(ethylene imine) to graft poly(ethylene glycol) or polysaccharide to polystyrene," Colloids and Surfaces, 66 (1992), pp. 149-156, 205, total of nine (9) pages (Spec, p. 10).
Michael C. Pirrung, "*How to Make a DNA Chip,*" Angew. Chem' Int. Ed., 2002, 41, pp. 1276-1289. (Spec, p. 1).
N. Zammatteo et al., "*Comparison between Different Strategies of Covalent Attachment of DNA to Glass Surfaces to Build DNA Microarrays,*" Analytical Biochemistry, 2000, 280, pp. 143-150. (Spec, p. 1).
K. Emoto et al., "*Grafting Poly(ethylene glycol) Epoxide to Amino-Derivatized Quartz: Effect of Temperature and pH on Grafting Density,*" Anal. Chem. 1996, 68, pp. 3751-3757. (Spec, p. 10).
Y. S. Lin et al., "*The surface density gradient of grated poly(ethylene glycol): preparation, characterization and protein absorption,*" Colloids and Surfaces B: Biointerfaces, 1994, 3, pp. 49-62. (Spec, p. 10).
E. Uchida et al., "*Grafting of Water-Soluble Chains onto a Polymer Surface,*" Langmuir, 1994, 10, pp. 481-485. (Spec, p. 10).

* cited by examiner

*Primary Examiner* — Christopher M Babic
*Assistant Examiner* — Jeremy C Flinders
(74) *Attorney, Agent, or Firm* — Collard & Roe, P.C.

(57) ABSTRACT

The invention relates to a carrier comprising at least one substrate, which has a coating in at least certain regions produced from individual modules by plasma polymerization, and the coating has one or more free spaces in at least certain regions for accommodating at least one solution containing a biological sample.

13 Claims, 4 Drawing Sheets

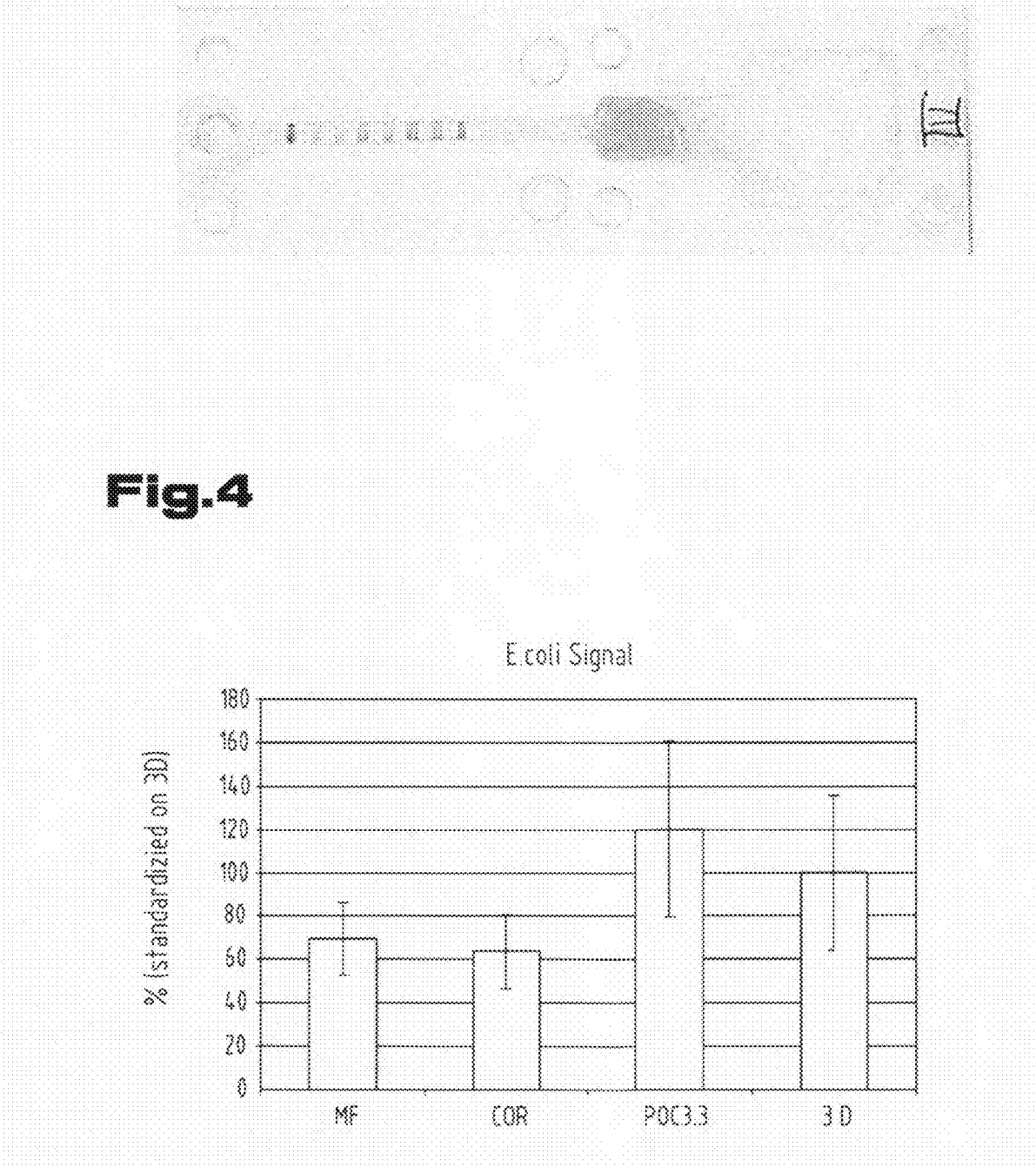

ically with the nano-gel. Solutions may be water-based or solvent-based or may contain other liquid groups, e.g. ionic liquids, as well as other solids, such as salts, dyes and other molecules or particles, including other biomolecules, or gases dissolved in them.

SURFACE MODIFICATION

CROSS REFERENCE TO RELATED APPLICATIONS

This application is the National Stage of PCT/EP2008/008598 filed on Oct. 10, 2008, which claims priority under 35 U.S.C. §119 of Austrian Application No. A 1619/2007 filed Oct. 10, 2007. The international application under PCT article 21(2) was not published in English.

This invention describes a carrier comprising at least one substrate, at least some areas of which are provided with a coating produced by subjecting individual modules to a process of plasma polymerisation, the use thereof as well as a method of producing it.

The carrier or the surface or surface properties of the carrier are of great importance in systems used in the field of microfluidics or in micro-array products for testing biological samples. Tests of this type often involve very painstaking work and are time-consuming and it is therefore particularly important that the assays used for this purpose are sensitive and reliable. A modification which can be of advantage for a particular application can be achieved on the basis of surface modifications, such as changing the chemical functionality, for example.

In the pharmaceutical industry, chemically modified surfaces are vital when it comes to developing biological test systems because providing the platform with defined coatings of chemical functional units enables the surface/biomolecule interaction to be controlled. Microarray technology is also based on the use of chemically modified surfaces for immobilising DNA (amino surface) or proteins (aldehyde, epoxy surface) [M. Pirrung, Angew. Chem. 2002, 41, 1276.—N. Zammatteo et. al., Analytical Biochemistry 2000, 280, 143.—M. Shena: Microarrays, A practical approach, Oxford University Press 1999.]

Genome tests involve the use of biological material containing nucleic acids and proteins, and many tests can be conducted in parallel. It is standard practice to immobilise biomolecules by chemical coupling or adsorption. Arrays containing biomolecules are currently produced, whereby the sample aliquots can be deposited under certain conditions, which enables the molecules to bind or be bound to the array surface. Alternatively or in addition, biomolecules can be synthesised on the array surface or directly or indirectly immobilised. The number of different samples which can be applied to a single array may be very high. The application process can be facilitated by array printers. Arrays are usually disposable products and it is therefore desirable to ensure a high degree of reproducibility and a minimum of errors during their production.

A known approach to achieving the desired effects is to subject carrier with many recesses or micro-fluidic devices to chemical treatments in order to improve the affinity for or retention of selected molecules at their surface. In this respect, it is desirable to bind the treated surface to the target molecule with greater affinity and retention without at the same time adversely affecting its biological activity, thereby making it possible to conduct a reproducible assay.

Patent specification WO 01/031339 A1 discloses the use of plasma polymerisation. An ultra-thin, cross-linked polymer film of ca. 200 nm is deposited on a substrate with a controllable chemical functionality. The properties of the substrate remain largely unaffected. Plasmas or ionic gases are usually excited by an electric field. The chemical environment is an extremely reactive one comprising ions, electrons, neutral particles and electromagnetic radiation. When the pressure is reduced, conditions can be achieved under which the temperature of the electrons differs significantly from that of the ions and neutral particles. In plasma polymerisation, Academic Press, London 1985, H. K. Yasuda describes how organic compounds (monomers) polymerise, either pure or in conjunction with other gases such as argon, for example, and how surfaces both in contact with the plasma and downstream of the discharge are coated. Plasma polymerisation is an effective route to obtaining solvent-free creation of thin (>5 nm) coatings. A cold plasma is created under vacuum by an electric discharge, which creates a very reactive environment containing ions, radicals, electrons and metastable particles. By selecting the reaction conditions accordingly, such as activation, pressure, power input, carrier gases and initial organic compounds (monomers), the reaction partner can be polymerised and the resultant plasma polymer deposited on substrates. Plasma polymers usually differ drastically from conventional polymers due to the lack of a continuous repeat unit and a high degree of cross-linking. The reason for this is the occurrence of a large number of reactive species in the plasma and as a result, a lower selectivity than is the case with conventional synthesis methods. The basic condition for use of potential monomers is the introduction of what are usually liquid precursors into the gas phase under the selected reaction conditions.

A surface modification made by plasma polymerisation is described in DE 603 04 163 T2 whereby a surface is created which is irregular and defines local surface regions. This surface has a higher affinity for biological molecules which are exposed to the surface. This is achieved by drawing some of the plasma through an orifice. Alternatively, plasma may be excited at the tip or in a micro-capillary.

The objective of this invention is to propose a carrier for immobilising nucleic acids whilst simultaneously minimising non-specific binding of proteins as well as a method of producing it.

The objective is achieved by the invention, individually in each case, by a carrier with a coating, and the coating has free spaces in at least certain regions for accommodating a solution, and a method whereby the coating creates free spaces in at least certain regions for accommodating the solution.

Free spaces in connection with the invention should be understood as meaning both two- and three-dimensional structures, which have a high binding capacity for nucleic acids whilst simultaneously minimising protein binding. Decisive factors in achieving this effect are both the structure imparted by the conditions of synthesis which results in a porous, swellable matrix, as well as polar aprotic chemical functional units to assist in repelling proteins in conjunction with adjacent polar chemical modules for selectively immobilising nucleic acids. The advantage of the functional, porous, swellable matrix with regard to immobilising nucleic acids is a) appropriate chemical binding partners in the functional layer in combination with b) increased binding capacity due to penetration by the binding partner in the layer and hence immobilisation in the layer and not just on the layer and c) optimisation of the immobilisation rate due to delayed evaporation and hence a longer reaction time of the solutions from the matrix. The advantage of the functional, porous, swellable matrix with regard to repelling proteins is the combination of the hydrate layer formed by the nano-gel on contact with buffer solutions containing aprotic synthesised modules which do not bind proteins. The invention therefore creates a synergetic effect, improving DNA binding whilst simultaneously repelling proteins.

The term solution in connection with the invention is intended to mean a liquid which is in a position to interact with the functional groups of the plasma-generated thin layers. This should be understood as meaning a liquid containing DNA, RNA, PNA, LNA, etc., for example.

The layer generated in this manner may advantageously be used for all applications where it is desirable to bind nucleic acids such as DNA, RNA, PNA, LNA or a mixed form thereof whilst simultaneously minimising the binding of proteins, for example enzymes, antibodies, antigens. This is the case in many detection reactions where nucleic acids are used as catcher probes. The most frequently used enzymes are horseradish peroxidase (HRP), glucose oxidase or alkali phosphatase, and these are used for reactions detectable by both colorimetric and chemo-luminescence and fluorescence reactions. For testing purposes, substances to be tested are firstly marked with a haptene, such as biotin, antigen, for example, and then hybridised on DNA probes for example. After washing, an enzyme coupled with a catcher molecule complementing the haptene, e.g. streptavidin, antibodies, is bound to the target probe complex. After a further washing step, substrate is added to the enzyme and the reaction product detected. Accordingly, this offers an advantageous way of adhering to the carrier only those molecules which find a binding partner with a specific binding site and no signals are emitted by non-specific deposits of reactants needed for the detection reaction.

The free spaces or cavities may extend both in two dimensions and in three dimensions. A network structure can be formed as a result. The coating preferably has a three-dimensional structure and forms a three-dimensional matrix or a three-dimensional structure is formed by the coating, which prevents the binding of proteins as far as possible.

It has also proved to be of advantage that the carrier proposed by the invention with a swellable coating and the method, whereby a plasma polymerisate capable of swelling in at least certain regions is created, offers an economic approach to imparting functions to surfaces in order to generate functional layers, because new types of properties can be imparted to conventional base materials by an inexpensive method of improving the substrate so that they lend themselves to new applications.

The swellable layer may include a hydrate layer or a hydrate layer may be formed when a predominantly aqueous medium is applied, thereby resulting in the high binding capacity for nucleic acids whilst simultaneously minimising protein binding, which optimises the reaction in terms of sensitivity, background and also sample consumption.

The coating formed has contact angles within a range with a lower limit of 35° and an upper limit of 65° with water as the measuring fluid, resulting in a reaction that is characteristic of materials which swell on contact with reaction solutions. When the sample is applied to the carrier, a stationary phase of a drop sitting on the hydrophilic surface briefly forms, which then rapidly diffuses into the surface.

The coating has a thickness selected from a range with a lower limit of 4 nm, preferably 10 nm, and an upper limit of 300 nm, preferably 40 nm. The resultant coating is also free of defects, cross-linked and stable for a long period of time and does not adversely affect the required main characteristics of the processed substrates, such as transparency or insolubility for example.

The material of the substrate of the carrier is made from plastics, selected from a group comprising a carbon-based or silicium-based polymer, from a group comprising polystyrene (PS), polyethylene (PE), polyethylene terephthalate (PET, PETP, PBTP), polypropylene (PP), polyvinylchloride (PVC), polyamides, nitrocellulose, polymethyl methacrylate (PMMA), styrene acrylonitrile (SAN), polycarbonate (PC), cyclo olefin copolymers (COC) such as cyclopentene-polyethylene copolymer, cyclohexane-polyethylene copolymer, cycloheptene-polyethylene copolymer and cyclo olefin polymers (COP) or similar, ditantal pentoxide, glass, metal or combinations thereof, and properties which permit binding of nucleic acids whilst simultaneously minimising or preventing protein binding can be imparted to both materials known from the prior art and new materials. Hybrid materials of plastics and glass have been found to be of particular practical advantage.

The substrate may also be provided in the form of a membrane, by means of which a large number of carriers can be modified. Furthermore, the substrate to be coated is not limited to a planar body, and it is also possible to coat structured or porous surfaces.

The individual modules may also comprise at least one monomer species, and if one species is used for the initial binding, a coating that is as uniform as possible can be obtained if necessary. Adding the individual modules leads to the formation of the plasma polymer.

The monomer species is selected from a group comprising amines, amides, dialkyloxyethane, and the monomer species may contain residues from a group comprising H, alkyl or aryl in each case, which will produce a coating with optimum properties for binding nucleic acids whilst simultaneously minimising protein binding. H, alkyl or aryl may be used as the residues R, and it is preferable to opt for residues with 1 to 8 carbon atoms, in particular 1 to 3 carbon atoms.

Before or during the plasma polymerisation process, the surface of the substrate can be activated in the plasma, and the process of synthesising the plasma polymerisation may be conducted without pre-treatment but will still result in a good capacity for binding nucleic acids whilst simultaneously repelling proteins. A two-stage synthesis is advantageously conducted, comprising plasma treatment in order to induce activation followed by plasma polymerisation, which results in a layer which is in a position to overcome the limitations which existed in the past in terms of economic feasibility and hence suitability for medical diagnostics, based on the binding capacity of DNA combined with simultaneous minimisation of non-specific binding of proteins. Performance is significantly better in the case of a two-stage process. If activation takes place downstream, impurities in the substrate or on the surface of the substrate can also be eliminated.

Activation may take place in a reactor with a reaction mixture containing a carrier gas and a reaction gas, and the carrier gas is an inert gas and the reaction gas is selected from group comprising oxygen, ammonia, $H_2$, $N_2$, $CO_2$, $C_2H_2$, thereby enabling inexpensive gases to be used, which makes the production of plasma polymerised surfaces economical.

In one embodiment, a flushing gas, preferably an inert gas, is fed into the reactor, in particular the reaction chamber, between activation and plasma polymerisation, so that products contaminating the plasma polymerisation are fed out of the reaction chamber. Activating the substrates by means of carrier and reaction gases such as $O_2$/Ar or $NH_3$/Ar plasmas, for example, also generates binding points at a higher power input.

The activation and/or plasma polymerisation may take place with a power input selected from a range with a lower limit of 0.1 W, preferably 2 W, in particular 5 W, and an upper limit of 2500 W, preferably 300 W, in particular 20 W. In the case of a two-stage synthesis, the substrates are preferably activated with a power input that is 5 to 20 times, preferably 9 to 18 times, higher than that used for the plasma polymerisation. For two-stage synthesis, activation preferably takes place at a plasma input selected from a range with a lower limit of 2 W and an upper limit of 2500 W and the plasma polymerisation is conducted at a plasma input selected from a range with a lower limit of 0.1 W and an upper limit of 400 W. The selected power input ensures that the structural and functional properties of the monomers are preserved as far as possible.

Using pulsed plasmas to form the coating also enables the structural and functional properties of the monomers to be preserved.

The at least one monomer species may be delivered in liquid or gaseous form, in which case the liquid monomers can be sprayed directly into the reactor, where they will be converted into the gas phase due to the prevailing pressure conditions, or they can be evaporated on the outside and delivered as a gas. It is not necessary to pre-clean the monomers by means of repeated degassing/gas flushing or freezing/degassing cycles connected downstream.

The pressure during activation and/or plasma polymerisation is selected from a range with an upper limit of 1.5 mbar, preferably 0.5 mbar, and a lower limit of 0.05 mbar, preferably 0.2 mbar, thereby resulting in optimum pressure conditions for the plasma polymerisation.

Activation takes place for a period with a lower limit of 1 min, preferably, 5 min, and an upper limit of 15 min, preferably 10 min, and/or the plasma polymerisation is run for a period based on a lower limit of 1.5 min, preferably, 10 min, and an upper limit of 60 min, preferably 20 min, thereby offering optimum results in terms of binding nucleic acids whilst simultaneously minimising protein binding.

To facilitate removal of the carrier from the reaction chamber and minimise odours as far as possible, the reactor, in particular the reaction chamber, is flushed with air and the chamber vented after polymerisation.

Results obtained with a view to testing the object of the invention and the method are set out below:

Of the diagrams:

FIG. 3 is an example showing an application for POC diagnostics on a carrier proposed by the invention FIG. 4 shows the immobilisation of DNA by functionalised surfaces known from the prior art compared with a functionalised surface proposed by the invention

Figure 1:
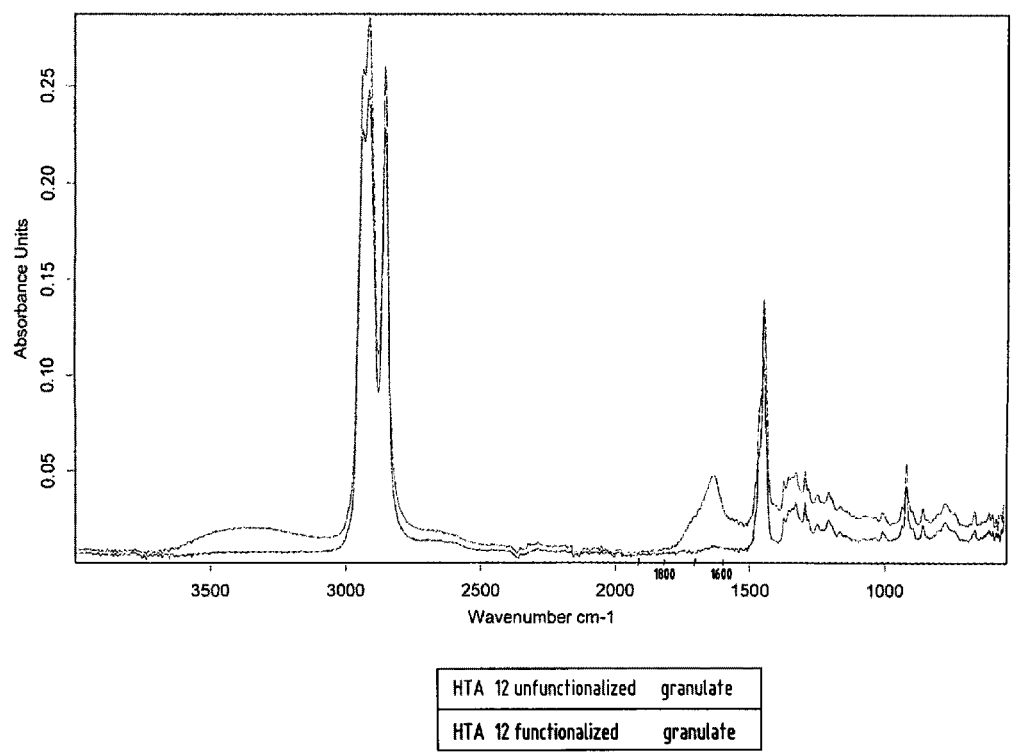
FIG. 1 is a FITR spectrum of a coated cyclo olefin polymer carrier based on example 1 compared with an uncoated carrier

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 2 to 9 or 4 to 7 or 5 to 6.

The capacity of the reaction chamber used for the method proposed by the invention and described below is between 0.01 m$^3$ and 0.8 m$^3$.

The purpose of the plasma treatment of the substrates by means of O$_2$/Ar or NH$_3$/Ar plasmas at a higher power input is to start activation by generating binding points. Reactants based on the classes of substances I to III specified below are then added immediately and lead to the formation of the plasma polymer. H, alkyl and aryl may be used as residues R, and the residues of a substance class may be the same or different. In substance class I, n is preferably selected so that it is between 1 and 5, and in this respect n=1 produces good results.

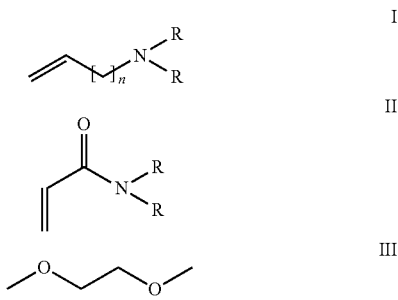

Between the activation step and the polymerisation step, a flushing gas (e.g. argon) may be used to remove reactants. In the preferred embodiment, it is not necessary to flush the reactor.

The substrate to be coated may be made from a carbon-based or silicium-based polymer, glass, ditantal pentoxide, metal or also membranes and is not limited to a planar body. Combinations of materials can also be processed.

The carrier gas may be argon or another inert gas; reaction gases might be oxygen, ammonia, H$_2$, N$_2$, CO$_2$ or similar representatives.

The plasma power preferably extends within the range of from 0.1 W to 2500 W, preferably 2 W to 300 W, and in a more particularly preferred embodiment from von 5 W to 20 W.

Plasma sources of the type known from the prior art may be used.

The liquid monomers may be sprayed directly into the reactor or introduced in the form of aerosols, in which case they will be converted to the gas phase under the prevailing pressure conditions, or they may be evaporated externally and introduced in the form of a gas. There is no need to pre-clean the monomers by means of repeated degassing/gas flushing or freezing/degassing cycles connected downstream.

The pressure ranges during polymerisation preferably lie between 0.05 mbar and 1.5 mbar, and in a preferred embodiment between 0.2 mbar and 0.5 mbar.

Depending on the bodies, the coating is deposited in a hydrophilic surface with preferred ranges of contact angles of from 35° to 65° with water as the measuring fluid.

The reaction time for activation may be in the range of from 1 min to 15 min; in a preferred embodiment, it is in the range of from 5 min to 10 min.

The reaction times for plasma polymerisation lie within the range of from 1.5 min to 60 min and in a preferred embodiment within the range of from 10 min to 20 min.

The coating thickness of the plasma polymers is 4 nm to 300 nm, and in a preferred embodiment 10 nm to 40 nm.

After polymerisation, the reaction chamber is flushed with air for a period of from 1 min to 5 min, the chamber vented and the coated bodies removed.

Depending on the dimensions of the reactor or reaction chamber, it may be necessary to adapt the values given above to suit the dimensions, but this is a routine matter for the person skilled in the art.

The resultant coatings exhibit behaviour that is characteristic of materials which swell when placed in contact with reaction solutions because when applied in drops, there is a brief (1-2 sec) stationary phase of a drop sitting on the surface, which then rapidly diffuses into the surface. This swelling creates a hydrate layer, which prevents the adhesion of proteins and is well documented, for example in the case of surfaces in contact with wet chemical polyethylene glycol (PEG) and polysaccharide (K. Emoto, Anal. Chem. 1996, 68, 3751—C. Brink, Colloid Surf 1992, 66, 149—Y. S. Lin, Colloids and Surf. B: Biointerfaces 1994, 3, 49—E. Uchida, Langmuir 1994, 10, 481). A mixture of PEG derivatives with Hydrophilic Lipophilic Balance Classifications between 5 and 8 with base polymers such as polystyrene, is documented in WO 1998/017407 A1 as a means of reducing protein binding.

EXAMPLE 1

Argon 5.6, $NH_3$ and N,N-dimethyl acrylamide are used as instructed by the manufacturer, e.g. Aldrich, Fluca. Bodies of polystyrene, cyclo olefin polymer and glass are placed in the reaction chamber and the pressure is reduced to 0.1 mbar. Argon and $NH_3$ are introduced at a pressure setting of 0.5 mbar and a power input of 180 W for 10 min. After stopping the activations process, the pressure is set to 0.1 mbar, increased to 0.35 mbar by adding argon and N,N-dimethyl acrylamide and the plasma polymerisation conducted at a power level of 15 W for 15 min.

EXAMPLE 2

Argon 5.6, $NH_3$ and N,N-dimethyl allylamine are used as instructed by the manufacturer. Bodies of polystyrene, cyclo olefin polymer and glass are placed in the reaction chamber and the pressure is reduced to 0.1 mbar. Argon and $NH_3$ are introduced at a pressure setting of 0.5 mbar and a power input of 100 W for 10 min. After stopping the activation process, the pressure is set to 0.1 mbar, increased to 0.5 mbar by adding argon and N,N-dimethyl allylamine and the plasma polymerisation conducted at a power level of 15 W for 20 min.

EXAMPLE 3

Argon 5.6, $NH_3$ and N,N-dimethyl allylamine are used as instructed by the manufacturer. Bodies of polystyrene, cyclo olefin polymer and glass are placed in the reaction chamber and the pressure is reduced to 0.1 mbar. Argon and $NH_3$ are introduced at a pressure setting of 0.5 mbar and a power input of 1700 W for 10 min. After stopping the activation process, the pressure is set to 0.1 mbar, increased to 0.5 mbar by adding argon and N,N-dimethyl allylamine and the plasma polymerisation conducted at a power level of 200 W for 20 min.

EXAMPLE 4

Argon and dimethoxyethane are used as instructed by the manufacturer. Bodies of polystyrene, cyclo olefin polymer and glass are placed in the reaction chamber and the pressure is reduced to 0.1 mbar. Argon and dimethoxyethane are introduced at a pressure setting of 0.6 mbar and a power input of 6 W for 40 min.

Due to the free spaces produced, repulsion of the proteins using the surfaces produced in proposed by the invention is higher than that of conventionally produced surfaces described in the prior art, for example, by a multiple. The binding properties of the functionalised surface were checked with the aid of a competitive ELISA Test, which showed that binding in the case of surfaces made as proposed by the invention was lower than that of conventional surfaces by a factor of 10.

It was also demonstrated that there was improved DNA immobilisation of the coatings obtained using the method proposed by the invention, which reduced the consumption of nucleic acid of the probes to be immobilised on the one hand and sample consumption on the other hand. The binding capacity for DNA is at least 40% higher than is the case with non-functionalised surfaces or surfaces functionalised by methods known from the prior art.

The largely intact structural unit C(=O)N can be detected using carbonyl tape characteristic for amides at 1680 $cm^{-1}$, as illustrated in the FITR spectrum shown in FIG. 1, where the peak at 1680 $cm^{-1}$ is the result of the surface of the carrier functionalised as proposed by the invention, whereas non-functionalised surfaces do not exhibit a peak at 1680 $cm^{-1}$.

Figure 2:
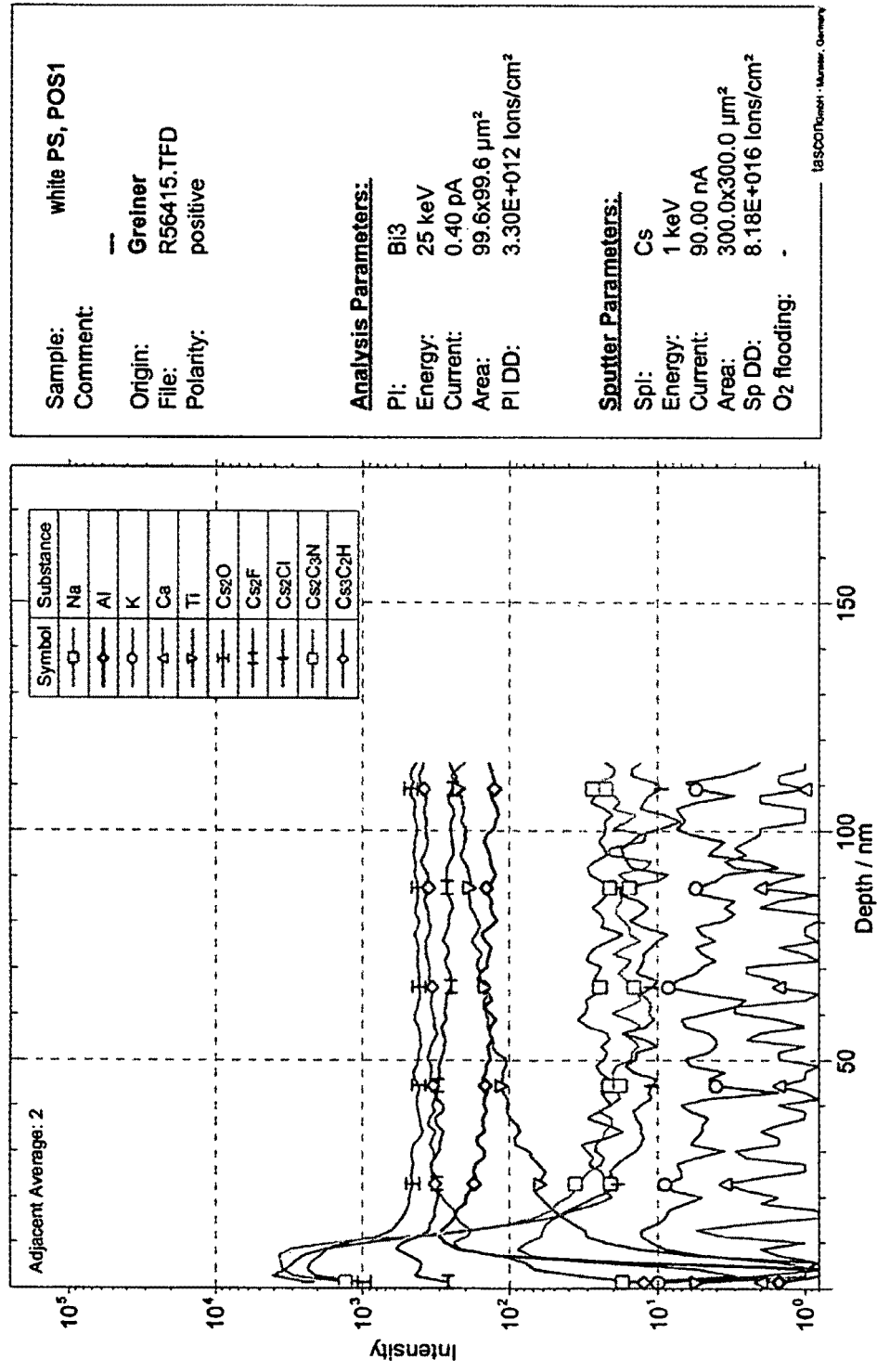
FIG. 2 is a ToF SIMS analysis of a depth profile and measurement of the layer thickness based on example 1

A depth profile and measurement of the coating thickness was conducted on the basis of the composition of the coating by means of ToF SIMS which, in the case of the preferred embodiment represented by example 1, showed a coating thickness of ca. 11 nm, as illustrated in FIG. 2. Depth profiles were produced with a view to determining the distribution of elements as a function of the depth. Using ToF-SIMS for depth profiling in the so-called "Dual-Beam-Mode", the sample surface is continuously sprayed with an ion beam (in this instance: Cs+), whilst a second ion beam (in this instance: Bi3+) is used to characterise the chemical composition of the crater base created as a result. The massive spraying needed for profiling causes damage to the body of solid material and with this type of analysis, it is only possible to detect the distribution of elements as a function of depth.

Results obtained from XPS tests on samples of embodiments based on the examples show a significantly altered composition compared with uncoated references. The measurements were taken with a PHI Quantera SXP apparatus: excitation radiation: AlKα; test spot: 200×200 $\mu m^2$.

Table 1 below sets out a comparison of the concentrations of elements as a percentage of atoms of transparent and white polystyrene (PS) as well as the ratios of concentrations. The results for both samples are very similar to one another. Overall, 11.6 percentage of atoms (At %) N were found in the uppermost ca. 10 nm of the samples and 13.7 At % O (transparent polystyrene) respectively 15.8 At % N and 16.6 At % O (white polystyrene).

TABLE 1

Concentrations of elements as a percentage of atoms and concentration ratio

|  | C | O | N | C/O | C/N |
|---|---|---|---|---|---|
| PS, transparent | 74.7 | 13.7 | 11.6 | 5.4 | 6.4 |
| PS, white | 67.7 | 16.6 | 15.8 | 4.1 | 4.3 |

Table 2 below gives proportions as a percentage of the chemical shifts in the C 1 s peaks; (C1 s aliphatic/aromatic: 284.8 eV; C—O/C—N: 286.2 eV; C=O/O—C—O: 287.5 eV)

The oxygen O 1 s peak was recorded at 531 eV (corresponding to O—C bonds) and the N 1 s peak was recorded at 399.5 eV (corresponding to N—C bonds).

By comparing the two tables, it may be concluded that ca. 33% of the carbon (corresponding to 24 At %) are not bonded in the C—C form. At 13 At % O and 11 At % N, therefore, there can be practically no bonds of C to 2 oxygen atoms. Accordingly, the C(=O)N structural unit continues to remain decisive after plasma polymerisation and fragmentation of the monomer can be largely ruled out.

TABLE 2 proportions as a precentage of the chemical shifts of the C 1 s peak

|  | C—C/C—H aliphatic/ aromatic | C—O/ C—N | C=O/ O—C—O |
|---|---|---|---|
| PS, transparent | 67 | 20 | 13 |
| PS, white | 68 | 16 | 16 |

The presence of a modified surface coating can therefore be confirmed by conducting different tests.

The carrier proposed by the invention may be used for array systems to detect target substances or for microfluidic structures. Typical potential applications are nucleic acid hybridisation arrays with signal generation, in which case methods known from the prior art must be used to incorporate a blocking step which covers the protein-binding points of the surface of the carrier with a non-protein binding coating because it would not be possible to obtain a signal through the background otherwise. This blocking step is rendered unnecessary by the carrier proposed by the invention.

Increasing the nucleic acid binding capacity at the surface of the carrier proposed by the invention also improves the sensitivity of nucleic acid hybridisation assays and thus improves the detection threshold.

The carrier proposed by the invention is also suitable for immunoassays because it avoids any non-specific binding of proteins at the surface and is thus able to prevent any background that would interfere with the signal.

Using the method proposed by the invention, it is also possible to render surfaces hydrophilic, in particular plastic surfaces, thereby making it possible to transport samples in micropassages. The method enables surfaces with recesses to be modified, and is therefore also suitable for structured surfaces.

Potential fields of application in Point of Care (POC) Diagnostics

The most dominant technique in POC applications to date is the so-called Lateral Flow Assay (LFA). The LFA is based on the same principle as other immunological assays (ELISA, Magnetic Bead Assays etc.), in that it makes use of the effect of the antibody-antigen reaction. In addition, it has chromatographic properties because the antibodies are bound to a membrane. The sample to be tested (solution) is drawn across the entire strip due to capillary forces and produces a rapidly visible result. For the reasons mentioned above, the LFA is also referred to as immuno-chromatography. The sample is supported on a sample support which separates removes any impurities (dust particles) in the sample. Lying underneath the sample support is the conjugate support which contains the conjugate (primary antibody). This will be the antibody to the target substance to be measured (e.g. ricin), which is bound to colloidal gold. The target substance, if the sample contains any, reacts on the conjugate support with the antibodies bound to the colloidal gold. The sample then flows onto the nitrocellulose membrane. This is divided into two consecutive zones. The first zone is a secondary antibody directed against the target substance and detects a different epitope (detection point of the antibody) from the conjugate. The other line contains an anti-species antibody, which reacts with the non-bound conjugate. The surplus liquid bound to the gold particles which have not been bound to the test or control line flows on through the membrane until it is absorbed by a filter paper, thus preventing any backflow. Nitrocellulose membranes are the most suitable membranes for an LFA. The properties of the nitrocellulose polymer in conjunction with the micro-porous structure make the membrane an ideal carrier material for most Lateral Flow Assays. A good membrane has the following properties: (i) high binding capacity, (ii) defined and precise capillary rate, (iii) uniform membrane surface which is free of dust and defects, (iv) uniform thickness of the membrane, (v) uniform quality between different batches.

Advantages of using the carrier proposed by the invention rather than the LIF-Assay known from the prior art are that (i) there is no need to insert an "external" membrane, (ii) there is no need for charging with gold conjugates, amongst others, (iii) the fluidics enable the liquid and substance to be transported and (iv) the surface chemistry guarantees efficient immobilisation with low non-specific binding (it may be that an additional work step involving saturation is unnecessary).

FIG. 3 illustrates an example of a POC application with a functional surface proposed by the invention, the function of which is explained below.

After immobilising specific DNA probes, a hybridisation is conducted with a complex sample. The immobilised DNA sequences are placed in contact with a hybridisation buffer which optionally contains the complementary sequences of the probes. The enzyme horseradish peroxidase (HRP) is bound to them by means of a conjugated protein. This enzyme belongs to the group of peroxidases and thus acts as a catalyst for oxidation in the presence of peroxide. For example, tetramethyl benzidine is converted from the colourless reduced form (TMBH2) to the blue oxidised form (TMB) in the presence of hydrogen peroxide.

This enzymatic colour reaction is the basis of the new detection method used here. After adding TMB and hydrogen peroxide, hybridisation leads to the colour reaction with a blue coloured precipitate. In this manner, the system can be used to detect hybridisation. The qualitative result of the assay can be assessed with the naked eye (FIG. 3). By scanning the assays and then taking a reading in grey scale, the intensity of the precipitate can be evaluated. This enables conclusions to be drawn about the immobilisation density, binding capacity and accessibility of the probes (FIG. 4). These are dependent on the immobilisation properties of the surface. Evidence that non-specific protein binding is minimised is found in an additional experiment (FIG. 5).

FIG. 3 illustrates an example of an application in Point of Care Diagnostics where specific sequences from a complex sample are identified whilst minimising non-specific protein binding. The coloured strips show evidence of the specific immobilisation of DNA in the sample with a diagnostically relevant sensitivity. The non-coloured region between the strips is evidence of minimised non-specific binding.

FIG. 4 illustrates the signal intensity of the DNA immobilisation illustrated in FIG. 3 compared with conventional methods of surface functionalisation (MF=photochemically functionalised surface by means of quinoid systems; COR=low-pressure plasma; 3 D=dendritic structural pattern for increasing the surface and maximising binding capacity—currently the gold standard). The POC3.3 surface is a surface proposed by the invention and results in good deposition compared with other functionalisation methods.

Figure 5:
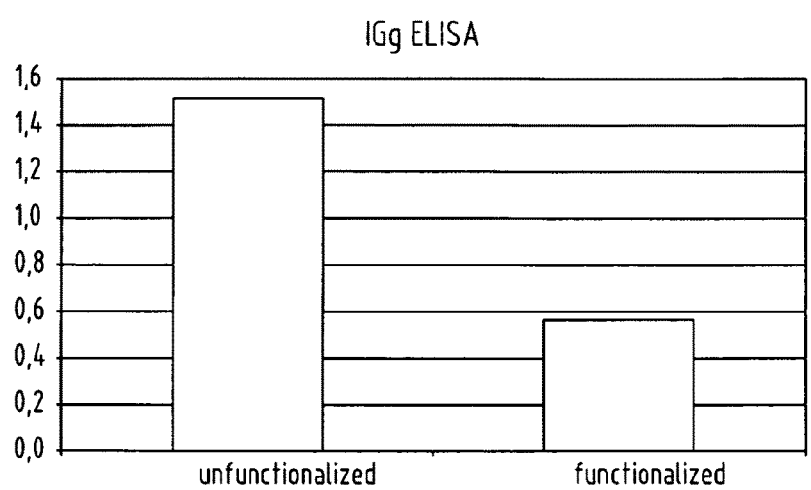
FIG. 5 shows the binding properties of the surface functionalised as proposed by the invention compared with a non-functionalised surface.

FIG. 5 illustrates the result of a test of the binding properties of the functionalised surface proposed by the invention using a competitive ELISA Test. An ELISA (Enzyme-Linked Immunosorbent Assay) or EIA (Enzyme-linked Immunoadsorption test) is based on an enzymatically triggered colour reaction. This test can be used to detect biomolecules, such as peptides, proteins, viruses, hormones or toxins, for example. The antigen (human IgG) is immobilised on the surface by adsorption overnight. The solution containing surplus antigen is removed during a washing step. The subsequent immunochemical reaction takes place on the basis of the competition principle. Marked and unmarked antibodies compete for the free binding points on the immobilised antigens. Horseradish peroxidase (HRP) is used as a marker enzyme in this instance. During a second washing step, surplus, non-bound antibodies are removed. Tetramethyl benzidine (TMB), the substrate added in the next step, is split by the enzyme HRP and thus releases a Turkish blue dye. The colour reaction is halted and fixed with sulphuric acid (change of colour to yellow). The intensity of the colour reaction is measured across the absorption by means of a photometer and thus enables a conclusion to be drawn about the binding behaviour of the tested surface. High absorption in this instance means a high number of bound antigens and vice versa. This makes it possible to ascertain that a significantly reduced adhesion of proteins is taking place compared with non-functionalised bodies.

The embodiments illustrated as examples represent possible variants of the method of producing the carrier, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

The objective underlying the independent inventive solutions may be found in the description.

The invention claimed is:

1. Method of modifying at least certain regions of a surface of a carrier, whereby a coating of at least one substrate containing individual modules of at least one monomer species is deposited via plasma polymerization, and free spaces are created in at least certain regions for accommodating at least one solution by activating the surface of the substrate in the plasma before plasma polymerization, wherein activation takes place in a reactor using a reaction mixture containing a carrier gas and a reaction gas, wherein the carrier gas is an inert gas and the reaction gas is selected from the group consisting of oxygen, ammonia, $H_2$, $N_2$, $CO_2$, and $C_2H_2$, and wherein activation is conducted at a 9 to 18 times higher power input than plasma polymerization, and generates binding sites, the carrier immobilizing nucleic acids whilst simultaneously repelling proteins.

2. Method as claimed in claim 1, wherein at least one swellable plasma polymerizate is created in at least certain regions.

3. Method as claimed in claim 1, wherein the at least one monomer species is added in liquid and/or gaseous form.

4. Method as claimed in claim 1, wherein the monomer species is selected from a group comprising amines, amides, dialkyloxyethane, and the monomer species contain residues from a group comprising H, alkyl or aryl.

5. Method as claimed in claim 1, wherein a flushing gas is fed through the reactor, in particular the reaction chamber, between activation and plasma polymerization.

6. Method as claimed in claim 5, wherein the flushing gas is an inert gas.

7. Method as claimed in claim 1, wherein activation and/or plasma polymerization takes place at a power input within a range with a lower limit of 0.1 W and an upper limit of 2500 W.

8. Method as claimed in claim 1, wherein activation is conducted at a plasma power selected from a range with a lower limit of 2 W and an upper limit of 2500 W and plasma polymerization is conducted at a plasma power selected from a range with a lower limit of 0.1 W and an upper limit of 400 W.

9. Method as claimed in claim 1, wherein the coating is deposited by pulsed plasmas.

10. Method as claimed in claim 1, wherein the pressure during activation and/or plasma polymerization is selected from a range with an upper limit of 1.5 mbar and a lower limit of 0.05 mbar.

11. Method as claimed in claim 1, wherein activation is conducted for a period with a lower limit of 1 minute and an upper limit of 15 minutes.

12. Method as claimed in claim 1, wherein plasma polymerization is conducted for a period with a lower limit of 1.5 minutes and an upper limit of 60 minutes.

13. Method as claimed in claim 1, wherein the reactor is flushed with air and the chamber vented after polymerization.

* * * * *